(12) United States Patent
Moshrefzadeh

(10) Patent No.: US 6,407,862 B2
(45) Date of Patent: *Jun. 18, 2002

(54) ELECTRONIC PROJECTION SYSTEM WITH POLYMERIC FILM OPTICAL COMPONENTS

(75) Inventor: Robert S. Moshrefzadeh, Oakdale, MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/312,339

(22) Filed: May 14, 1999

(51) Int. Cl.$^7$ ................................................ G02B 1/10
(52) U.S. Cl. ........................ 359/584; 359/589; 428/212
(58) Field of Search ................................. 359/584, 589; 428/212

(56) References Cited

U.S. PATENT DOCUMENTS 3,124,639 A   3/1964  Kahn ............................ 88/65

(List continued on next page.)

FOREIGN PATENT DOCUMENTS

| EP | 0 434 041 A | 6/1991 | |
|----|----|----|----|
| JP | 04 070827 A | 3/1992 | |
| JP | 05 236405 A | 9/1993 | |
| WO | WO 95/27919 | 4/1995 | ........... G02B/27/28 |
| WO | WO 95/17303 | 6/1995 | ............. B32B/7/02 |
| WO | WO 95/17691 | 6/1995 | ............. G02B/5/30 |
| WO | WO 95/17692 | 6/1995 | ............. G02B/5/30 |
| WO | WO 95/17699 | 6/1995 | ......... G02F/1/1335 |
| WO | WO 97/01440 | 1/1997 | ........... B32B/27/36 |
| WO | WO 97/01774 | 1/1997 | ............ G02B/1/10 |
| WO | WO 98/14828 | 4/1998 | |

OTHER PUBLICATIONS

Schrenk et al., Nanolayer polymeric optical films, Tappi Journal, pp. 169–174, Jun., 1992.

*Primary Examiner*—Darren Schuberg
*Assistant Examiner*—Fayez Assaf
(74) *Attorney, Agent, or Firm*—Jeffrey J. Hohenshell; William D. Miller

(57) ABSTRACT

An electronic projection system that includes specularly reflective optical components made of a multilayered polymeric material with a reflectivity of at least 96% from about 400 nm to about 700 nm, and a method for enhancing the optical quality of a projected image in a projection display device comprising the step of incorporating at least one specular mirror component in the optical train of the device.

3 Claims, 2 Drawing Sheets

U.S. PATENT DOCUMENTS

| | | | |
|---|---|---|---|
| 3,610,729 A | 10/1971 | Rogers | 350/157 |
| 3,711,176 A | 1/1973 | Alfrey, Jr. et al. | 350/1 |
| 3,860,036 A | 1/1975 | Newman, Jr. | 138/45 |
| 4,944,581 A * | 8/1980 | Ichikawa | 359/884 |
| 4,446,305 A | 5/1984 | Rogers et al. | 528/348 |
| 4,520,189 A | 5/1985 | Rogers et al. | 528/331 |
| 4,521,588 A | 6/1985 | Rogers et al. | 528/363 |
| 4,525,413 A | 6/1985 | Rogers et al. | 428/212 |
| 4,720,426 A | 1/1988 | Englert et al. | 428/344 |
| 5,146,365 A | 9/1992 | Minoura et al. | 359/619 |
| 5,188,760 A | 2/1993 | Hikmet et al. | 252/299.01 |
| 5,211,878 A | 5/1993 | Reiffenrath et al. | 252/299.63 |
| 5,235,443 A | 8/1993 | Barnik et al. | 359/37 |
| 5,269,995 A | 12/1993 | Ramanathan et al. | 264/171 |
| 5,294,657 A | 3/1994 | Melendy et al. | 524/270 |
| 5,316,703 A | 5/1994 | Schrenk | 264/1.3 |
| 5,319,478 A | 6/1994 | Fijnfschilling et al. | 359/53 |
| 5,389,324 A | 2/1995 | Lewis et al. | 264/171 |
| 5,448,404 A | 9/1995 | Schrenk et al. | 359/584 |
| 5,467,154 A | 11/1995 | Gale et al. | 353/119 |
| 5,486,935 A | 1/1996 | Kalmanash | 359/37 |
| 5,486,949 A | 1/1996 | Schrenk et al. | 359/498 |
| 5,548,440 A * | 8/1996 | Hohenegger et al. | 359/360 |
| 5,557,343 A | 9/1996 | Yamagishi | 348/781 |
| 5,612,820 A | 3/1997 | Schrenk et al. | 359/498 |
| 5,629,055 A | 5/1997 | Revol et al. | 428/1 |
| 5,686,979 A | 11/1997 | Weber et al. | 349/96 |
| 5,699,188 A | 12/1997 | Gilbert et al. | 359/584 |
| 5,721,603 A | 2/1998 | De Vaan et al. | 349/194 |
| 5,744,534 A | 4/1998 | Ishiharada et al. | 524/442 |
| 5,751,388 A | 5/1998 | Larson | 349/96 |
| 5,767,935 A | 6/1998 | Ueda et al. | 349/112 |
| 5,770,306 A | 6/1998 | Suzuki et al. | 428/328 |
| 5,783,120 A | 7/1998 | Ouderkirk et al. | 264/134 |
| 5,793,456 A | 8/1998 | Broer et al. | 349/98 |
| 5,808,794 A | 9/1998 | Weber et al. | 359/487 |
| 5,825,542 A | 10/1998 | Cobb, Jr. et al. | 359/487 |
| 5,825,543 A | 10/1998 | Ouderkirk et al. | 359/494 |
| 5,882,774 A | 3/1999 | Jonza et al. | 428/212 |

* cited by examiner

ELECTRONIC PROJECTION SYSTEM WITH POLYMERIC FILM OPTICAL COMPONENTS

FIELD OF THE INVENTION

The present invention relates to electronic projection systems with specularly reflective optical components. More particularly, the present invention relates to front or rear screen electronic projection systems with specularly reflective optical components made of a multilayered polymeric film. Compared to conventional specularly reflective optical components, the enhanced reflectivity of the multilayered polymeric film over a wide wavelength range improves the optical performance of a projection system by increasing brightness, improving color gamut, increasing contrast, reducing color shift, and reducing power consumption.

BACKGROUND OF THE INVENTION

In an electronic projection system an image is projected onto an image surface of a screen component. The optical train in a conventional electronic projection system uses many optical components, including, for example, mirrors, beam splitters, polarizers, and the like. In designing the optical train the effect of each of these components on the image to be displayed must be considered. Each time the image to be displayed encounters an optical component in the optical train, the integrity of the original optical signal may be compromised. For example, reflection at the surface of a specular mirror may cause a color shift as some wavelengths of light in the incident image signal are absorbed by the reflective surface of the mirror. This color shift reduces the quality of the image projected to the screen for viewing by an observer.

The specularly reflective optical components used in electronic projection systems are metal coated glass plates, referred to as second surface "silvered" mirrors. These metal coated mirrors are glass plates coated on a back surface with a metallic layer, typically silver or other highly reflective metal. Metal coated mirrors reflect a wide range of wavelengths of incident visible light, but the reflectivity of wavelengths in the blue (about 400 nm to about 450 nm) and the red (about 600 nm to about 700 nm) regions of the spectrum are reflected much less strongly than the wavelengths in the green (about 450 nm to about 600 nm) portions of the spectrum. These variations in reflectivity cause color shifts in the light reflected from the metallic surfaces and cause color imperfections in the projected image of an electronic projection system. These variations become more pronounced as the number of reflective optical components in the optical train increase, and result in corresponding color defects in the projected image.

SUMMARY OF THE INVENTION

In one aspect, the present invention provides an electronic projection system that includes specularly reflective optical components made of a multilayered polymeric material described in U.S. Pat. No. 5,882,774 and WO 97 01774. Compared to conventional metal coated mirrors, optical components made of the multilayered polymeric reflective components described in the '774 patent and '774 publication have greater and more uniform reflectivity over the entire portion of the visible spectrum from about 400 nm to about 700 nm. This broad range of reflectivity may be used to advantage in any optical train, but it provides specific benefits in electronic projection display systems. If a conventional optical component in the optical train of a projection display system is replaced with an optical component made of the multilayered polymeric film described in the '774 patent, the light reflected from these components has less color shift (greater color uniformity) over the entire region of visible spectrum. This reduced color shift provides a projected image with increased brightness, enhanced color gamut, and increased contrast.

The optical components in the optical engines of conventional projection systems absorb in the blue region of the spectrum, so enhanced reflectivity in the blue region is particularly important in projection display applications. Therefore, in a second aspect, the present invention is a method for enhancing the optical quality of the projected image in a projection display device. Specifically, the present invention is a method of enhancing the optical quality of the projected image in a projection display device by reducing the color shift caused by reflections from the specularly reflective optical components in the optical train of the device. The optical quality is enhanced by incorporating at least one specular mirror component in the optical train of the device, wherein the specular mirror component comprises a multilayered optical film with a reflectivity of at least 96% from about 400 nm to about 700 nm.

The enhanced reflectivity and reduced color shift caused by the specularly reflective optical components of the present invention in the blue and red regions of the spectrum also provides a method for improving the color gamut of the projected image in a projection display device. If more blue and red light is reflected from the surfaces of the specularly reflective optical components in the optical train of the device, a richer and more varied palate of colors may be produced in the reflected image and projected on the screen to the viewer.

DETAILED DESCRIPTION OF THE INVENTION

Figure 1:
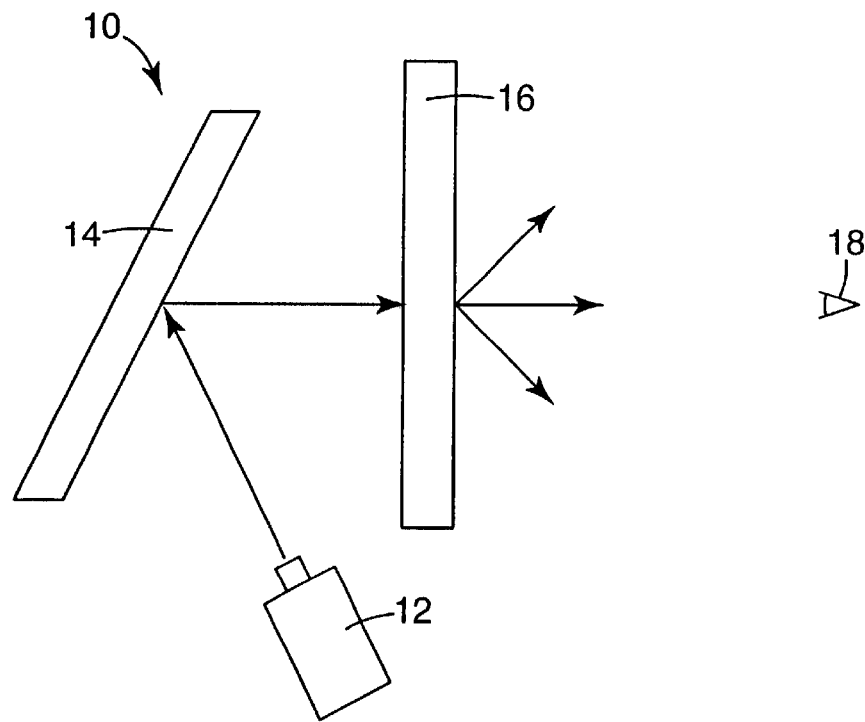
FIG. 1 is a schematic diagram of a conventional "single bounce" rear projection display system.
Figure 2:
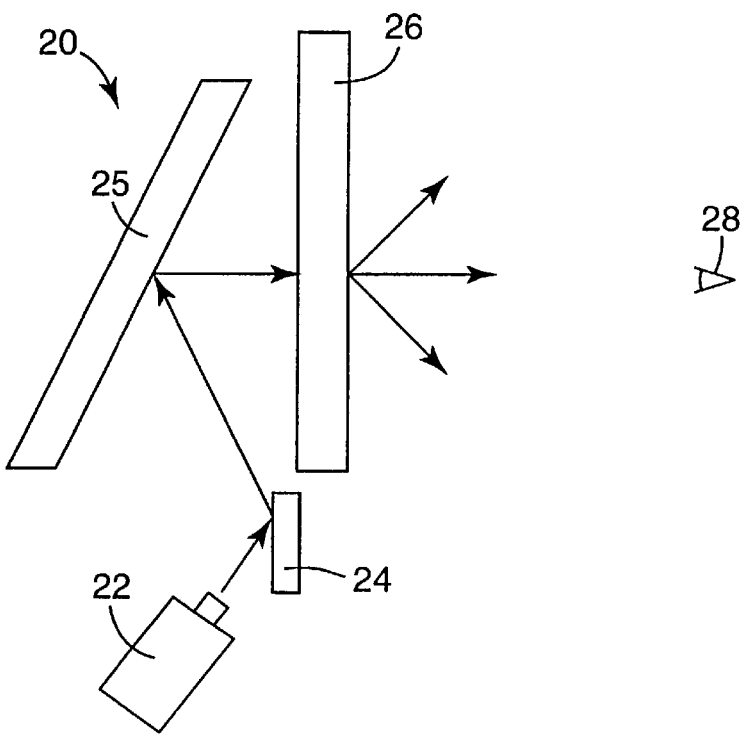
FIG. 2 is a schematic diagram of a conventional "double bounce" rear projection display system.

A conventional "single bounce" rear projection system 10 is shown in FIG. 1, and includes a light source 12, at least one specular mirror 14 and a screen 16. An image produced in the light source 12 is reflected at a surface of the mirror 14. The reflected image is viewed through the screen 16 by an observer 18. FIG. 2 illustrates a conventional "double bounce" rear projection system 20. The double bounce rear projection system 20 includes a light source 22, a first specular mirror 24, a second specular mirror 25, and a screen 26. An image produced in the light source 22 is reflected first at a surface of the first mirror 24 and again at a surface of the second mirror 25. The twice-reflected image is viewed through the screen 26 by an observer 28. Conventional projection systems utilize metal-coated mirrors to perform the reflective functions in the optical trains 10 and 20.

If the conventional metal coated specular mirror 14 in the single bounce system 10 and the metal coated specular mirrors 24, 25 in the double bounce system 20 are replaced with free standing layers of the multilayered polymeric films described in U.S. Pat. No. 5,882,774 and WO 97 01774, both incorporated herein by reference, the present inventors have identified many unexpected enhancements to the optical performance of the systems 10 and 20.

Figure 3:
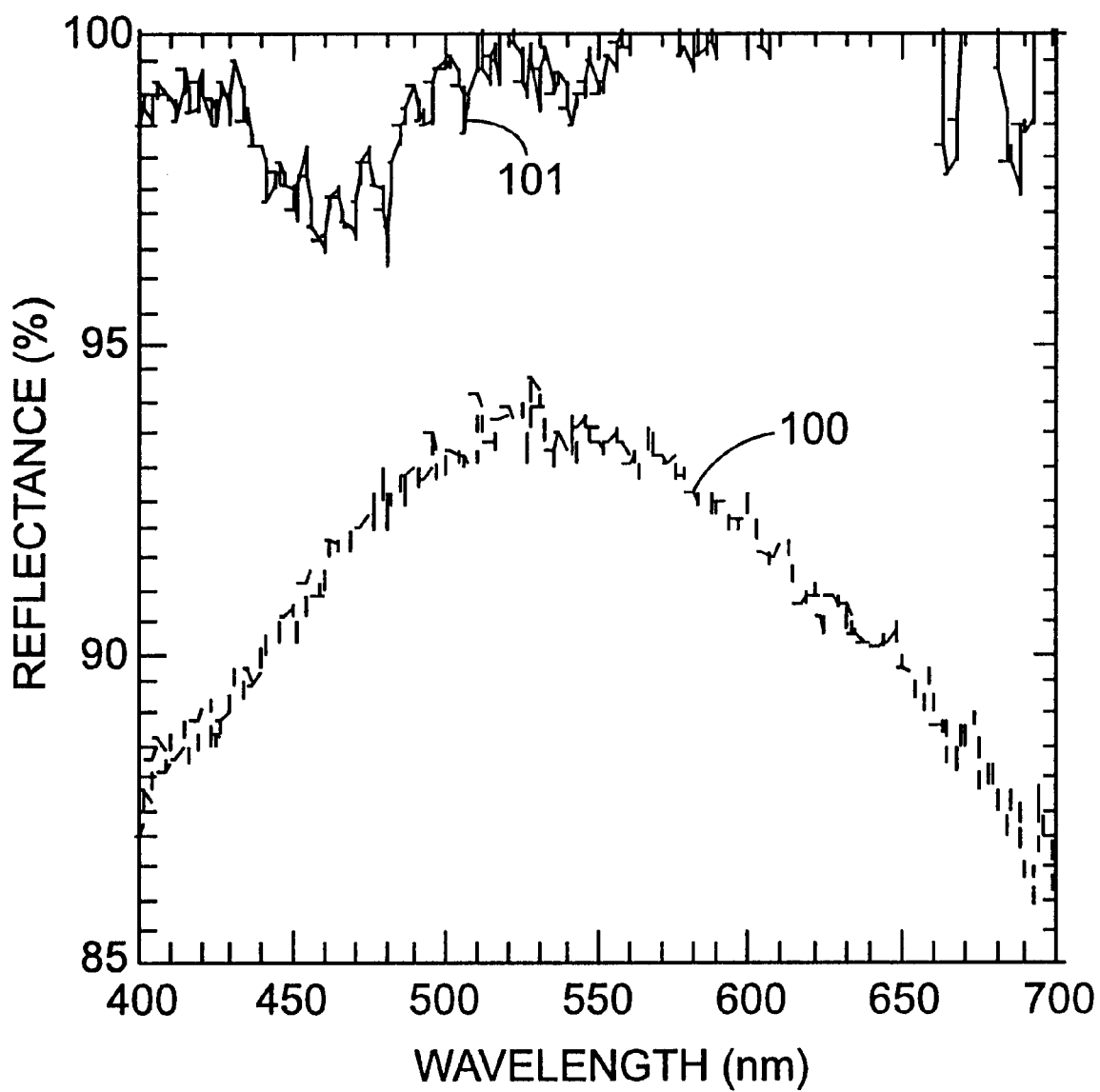
FIG. 3 is a plot comparing the reflectance at a 5° incident angle of a standard glass mirror to that of a multilayered polymeric mirror (described in U.S. Pat. No. 5,882,774 and WO 97 01774) over a range of about 400 to about 700 nm.

FIG. 3 illustrates the improvement in specular reflectance at a 5° incident angle of the multilayered polymeric films of U.S. Pat. No. 5,882,774 and WO 97 01774 (curve 101) with the specular reflectance of a conventional silvered glass mirror (curve 100). The plots in FIG. 3 show that the reflectivity of the multilayered polymeric film are greater than about 96% over the entire visible spectrum (about 400 nm to about 700 nm), and for many wavelengths approaches is very nearly about 100%. The multilayered polymeric film appropriate for use in the present invention has a reflectivity over 400–700 nm of at least 96%, preferably at least 98%, and most preferably, at least 99%. According to FIG. 3, the average transmittance of the multilayered polymeric films over the visible spectrum from 400–700 nm was about 99.4%, compared to about 91% for the conventional mirrors.

FIG. 3 also illustrates that the reflectivity of the multi-layered polymeric films of U.S. '774 and WO '774 is significantly greater in the blue (about 400 nm–about 450 nm) and red (about 550 nm–about700 nm) portions of the spectrum. Table 1 shows measured reflectivities in different spectral ranges for the single bounce system of FIG. 1.

TABLE 1

|            | 400–450 nm | 450–550 nm | 550–700 nm |
|------------|------------|------------|------------|
| % Increase | 11.2       | 6.1        | 9.4        |

Table 2 shows measured reflectivities in different spectral ranges for the double bounce system of FIG. 2.

TABLE 2

|            | 400–450 nm | 450–550 nm | 550–700 nm |
|------------|------------|------------|------------|
| % Increase | 23.6       | 12.6       | 19.7       |

FIG. 3 and Tables 1 and 2 show that the multilayer polymeric films of U.S. '774 and WO '774 have more reflectivity at all wavelengths of the visible spectrum, particularly in the blue region from about 400 nm to about 450 nm and the red region from about 550 nm to about 700 nm. The enhanced reflectivity in the blue is very important in an electronic projection system since most optical components in the optical engine of a rear projection system (light sources 12 in FIG. 1 and 22 in FIG. 2) absorb some of the blue wavelengths of light. The enhanced reflectivity in the blue and/or red region of the spectrum provides a projected image with increased brightness, improved color gamut, and increased contrast.

The multilayered polymeric films of U.S. '774 and WO '774 also exhibit less color shift than a conventional metal-coated mirror, which indicates that the integrity of the original optical signal is substantially preserved upon reflection from the surface of the films. Table 3 illustrates the color shifts for a standard illuminant D source of the single bounce rear projection system of FIG. 1 and the double bounce rear projection system of FIG. 2.

TABLE 3

|                                                          | Single Bounce (FIG. 1) | | Double Bounce (FIG. 2) | |
|----------------------------------------------------------|-------|-------|-------|-------|
|                                                          | Δx    | Δy    | Δx    | Δy    |
| Polymeric Film of U.S. '774 and WO '774                  | 0.001 | 0.002 | 0.002 | 0.003 |
| Glass Metal Coated Mirror                                | 0     | 0.004 | 0     | 0.007 |

The polymeric film material clearly has significantly less color shift, particularly in the double bounce system of FIG. 2.

This broad range of reflectivity exhibited by the polymeric optical films of U.S. '774 and WO '774 may be used to advantages in any optical train, but the films provide specific benefits in electronic projection display systems. If a conventional optical component in the optical train of a projection display system is replaced with an optical component made of the multilayered polymeric film described in the '774 patent, the light reflected from these components and projected for the viewer, the reduced color shift produces an image with greater color uniformity over the entire region of visible spectrum. This reduced color shift provides a projected image with increased brightness, improved color gamut, and increased contrast.

It should be understood that while rear projection display systems are exemplified in the present application, these benefits would be expected to apply to front projection display systems as well.

The multilayered polymeric films may be produced according to the methods described in U.S. Pat. No. 5,882,774 and WO 97 01774. The films are normally stretched over and attached to a rigid frame to provide a specular mirror component for use in an optical system. The framed polymeric mirror components are considerably lighter than conventional metal coated glass mirrors, and their non-metallic properties make the framed components substantially unbreakable, more scratch resistant and more moisture resistant than their glass counterparts.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. An electronic rear screen projection display device comprising:

a light source producing an image, a screen having a rear surface for receiving light from the light source, and a front surface adapted to be viewed, and at least one mirror disposed in a light path between the light source and the screen so that it reflects the image produced by the light source, the mirror comprising a multilayered, non-metallic, polymeric optical film with a reflectivity of at least 96% from 400 nm to 700 nm.

2. A method of enhancing the optical quality of an image to be viewed in a projection display device comprising the steps of:

producing an image from a light source, providing a screen having a rear surface for receiving light from the light source, and a front surface for viewing, placing at least one mirror in a light path between the light source and the screen, the mirror comprising a multi-layered optical film, and reflecting at least 96% of light in the wavelength range from 400 nm to 700 nm in the mirror, and receiving the reflected light on the back surface of the screen.

3. A method of using a mirror in a rear projection screen display device, the mirror comprising a multilayered, non-metallic, polymeric optical film with a reflectivity of at least 96% from 400 nm to 700 nm, the rear projection display device comprising a light source for producing an image, a screen having a rear surface for receiving light from the light source, and a front surface adapted to be viewed, the method comprising the step of placing the one mirror in a light path between the light source and the screen so that at least 96% of light in the wavelength range from 400 nm to 700 nm is reflected in the mirror.

* * * * *